US005294411A

United States Patent [19]

Breuer et al.

[11] Patent Number: 5,294,411

[45] Date of Patent: Mar. 15, 1994

[54] HONEYCOMB BODY WITH HEATABLE CATALYTIC ACTIVE COATING

[75] Inventors: Hans-Jürgen Breuer; Rolf Brück, both of Overath, Fed. Rep. of Germany

[73] Assignee: Emitec Gesellschaft fuer Emissionstechnologie mbH, Lohmar, Fed. Rep. of Germany

[21] Appl. No.: 18,725

[22] Filed: Feb. 17, 1993

Related U.S. Application Data

[63] Continuation-in-part of Ser. No. 779,365, Oct. 17, 1991, abandoned, and a continuation of PCT/EP89/00410, April 17, 1989.

[30] Foreign Application Priority Data

Apr. 17, 1989 [EP] European Pat. Off. ........ 89904535.5

[51] Int. Cl.[5] ........................ F01N 3/10; B01D 53/36

[52] U.S. Cl. ...................................... 422/174; 55/524; 60/300; 422/171; 422/180; 422/211

[58] Field of Search ............... 422/174, 171, 177, 211; 60/300; 502/527, 339, 325; 55/523, DIG. 30, 524; 96/146

[56] References Cited

U.S. PATENT DOCUMENTS

| | | | |
|---|---|---|---|
| 1,789,812 | 1/1931 | Frazer . | |
| 3,768,982 | 10/1973 | Kitzner et al. | 60/300 |
| 3,770,389 | 10/1973 | Kitzner et al. | 422/174 |
| 3,785,781 | 1/1974 | Hervert et al. . | |
| 3,910,042 | 10/1975 | Yuge et al. | 60/300 X |
| 4,072,471 | 2/1978 | Morgan, Jr. et al. | 423/213.7 X |
| 4,404,795 | 9/1983 | Oishi et al. | 60/274 |
| 4,416,674 | 11/1983 | McMahon et al. | 422/171 |
| 4,783,958 | 11/1988 | Borja | 60/274 |
| 4,813,231 | 3/1989 | Bykowski | 60/274 |
| 4,851,015 | 7/1989 | Wagner et al. | 60/313 X |
| 4,900,517 | 2/1990 | Domesle et al. | 422/171 |
| 4,976,929 | 12/1990 | Cornelison et al. | 422/174 |

FOREIGN PATENT DOCUMENTS

| | | |
|---|---|---|
| 0154145 | 9/1985 | European Pat. Off. . |
| 0298240 | 1/1989 | European Pat. Off. . |
| 0483708 | 5/1992 | European Pat. Off. . |
| 563757 | 7/1930 | Fed. Rep. of Germany . |
| 2230663 | 3/1975 | Fed. Rep. of Germany . |
| 3711101 | 10/1987 | Fed. Rep. of Germany . |

OTHER PUBLICATIONS

SAE—The Engineering Resource for Advancing Mobility; Feb.-Mar. 1, 1985; Rao et al "Advanced Techniques for Thermal and Catalytic Diesel Particulate Trap Regeneration", pp. 57-73.

*Primary Examiner*—Robert J. Warden
*Assistant Examiner*—Amalia Santiago
*Attorney, Agent, or Firm*—Herbert L. Lerner; Laurence A. Greenberg

[57] ABSTRACT

A catalyst carrier body has a honeycomb element with walls defining a multiplicity of channels through which a gas can flow. The honeycomb element has a catalytically active surface layer. The active surface layer is electrically heated for improving cold-starting properties and/or to raise the operating temperature in the catalytic converter.

4 Claims, 1 Drawing Sheet

HONEYCOMB BODY WITH HEATABLE CATALYTIC ACTIVE COATING

CROSS-REFERENCE TO RELATED APPLICATION

This application is a continuation-in-part application of Ser. No. 07/779,365, filed Oct. 17, 1991, which was a continuation of international application PCT/EP89/00410, filed Apr. 17, 1989.

BACKGROUND OF THE INVENTION

Field of the Invention

The present invention relates to a device disposed in an exhaust gas channel of internal combustion engines, which is suitable for converting components that are entrained in the exhaust gas as a consequence of fuel combustion and to which effects that are hazardous to the health are ascribed if they get into the atmosphere and consequently into the air being breathed in. Particularly, the invention pertains to a device for promoting catalytically aided conversion reactions.

Increasingly stringent requirements must be met by catalysts, and particularly by catalytic converters in automobiles. Tightened government regulations around the world and a growing environmental consciousness place increased importance on efficient conversion of poisonous emission components in exhaust gases. Conventional three-way catalysts promote the conversion of carbon monoxide (CO), hydrocarbons (HC) and the oxides of nitrogen (NOx) into carbon dioxide ($CO_2$), water ($H_2O$) and nitrogen (N).

Catalyst materials are active within a certain temperature range. For instance, in the so-called cold-starting phase of internal combustion engines, i.e. when relatively low-temperature exhaust gas from a "cold" engine impinges on catalyst material which is not yet heated, the catalytic action of the device is very limited. As a result, for several seconds after start-up of the engine, the above-mentioned toxic compounds are exhausted into the air. As a possible solution to this problem, the art has provided electrically heated catalytic converters. Such starting catalysts or pre-catalysts are usually disposed upstream of the main catalytic converter in the exhaust stream. German Patent DE-PS 563,757 and German Published, Non-Prosecuted Patent Application DE-AS 22,30,663, for instance, provide metal honeycomb bodies which may be heated electrically. Relatively high power consumption and a certain time delay in reaching the optimum operating temperature (not only the active surface, but also the carrier monolith is heated) still hamper the applicability of those devices.

As mentioned above, the efficiency of catalytically aided conversion is dependent on the operating temperature. In this context, certain reactions may proceed more efficiently at a temperature above a given operating temperature. For that purpose, it is advisable to provide auxiliary heating aside from the generally known starting catalysts.

Such heating for attaining temperatures above the regular operating temperature of the exhaust are found in a similar field of endeavor. For instance, German Published, Non-Prosecuted Application DE 37,11,101 A1, which pertains to a catalyst-coated exhaust filter for solid particles, i.e. a soot filter assembly, discloses a proposal for obtaining the heat supply necessary to reach the ignition temperature from the oxidation of further substances inevitably entrained in the exhaust gas, such as carbon monoxide and hydrocarbons. Such oxidation takes place catalytically at the surface of honeycomb elements of the type described that are provided, for example, with a platinum coating, such as those which are also used to reduce the proportion of pollutants in the exhaust gases of Otto engines.

It is accordingly an object of the invention to provide a honeycomb body with a heatable, catalytically active coating, which overcomes the hereinafore-mentioned disadvantages of the heretofore-known devices of this general type and which provides a surface in the exhaust system which fulfills the dual purpose of being catalytically active as well as its own heating system. Another object of the invention is to lower power consumption for the heating to a minimum and to provide a device which reaches an optimal catalyst operating temperature as quickly as possible.

With the foregoing and other objects in view there is provided, in accordance with the invention, a catalyst carrier body, comprising a honeycomb element having walls defining a multiplicity of channels through which a gas can flow, a catalytically active surface layer disposed on the honeycomb element, and means for electrically heating the catalytically active surface layer.

The catalytically active surface layer may thus be regarded as an electrical auxiliary heater. Due to the fact that the surface layer is very thin (only 1-5 μm in some instances), a relatively small amount of electrical energy will appreciably raise the temperature of the auxiliary heater in a very short period of time.

In accordance with an added feature of the invention, the catalytically active surface layer is metallic.

In accordance with an additional feature of the invention, the catalytically active surface layer is formed of materials selected from the group consisting of rhodium and platinum.

In accordance with a further feature of the invention, the honeycomb element is formed of ceramic material. Due to the dielectric behavior of ceramic material and its very low heat conductivity, a metallic coating layer on a ceramic monolith will provide a relatively simple and efficient solution to the afore-mentioned problems.

If several honeycomb elements are provided in a catalytic converter system, then at least one of the monoliths may be formed of a ceramic material, and the catalytically active surface layer is a heating element of the electrical auxiliary heater.

In accordance with a concomitant feature of the invention, the electrical heating means include a power source and an electrical connection between the power source and the catalytically active surface layer.

In stacking various honeycomb elements, upstream elements are provided with a surface layer which causes the catalytic conversion of the oxides of nitrogen and carbon monoxide to nitrogen and carbon dioxide, respectively.

Those chemical reactions are well understood. They are known to be exothermic, so that the temperature of the exhaust gas is increased upon leaving the upstream honeycomb elements. Furthermore, the pollutants CO and $NO_x$ are at the same time converted into safe compounds.

There may be provided, in addition to the above-mentioned catalytic converter elements and/or as a part of the auxiliary heater, a further electrically heated honeycomb element. An additional honeycomb element may, for instance, be employed in a regulated catalytic converter which requires the aspiration of additional air. In that case, the additional element is disposed in a channel through which the additional air flows.

The same reasons are mainly responsible for using metallic material that also prompted applicants to provide such honeycomb elements as catalyst supports for the detoxification of the exhaust gases of Otto engines, namely a more rapid achievement of their operating temperature in addition to an increased mechanical strength, as is important, in particular, for use in road vehicles. In addition, the current can travel directly through the metallic honeycomb elements and the latter can therefore function as radiators for the proposed auxiliary heater.

Other features which are considered as characteristic for the invention are set forth in the appended claims.

Although the invention is illustrated and described herein as embodied in a honeycomb body with heatable, catalytically active coating, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF A PREFERRED EMBODIMENT

Figure 1:
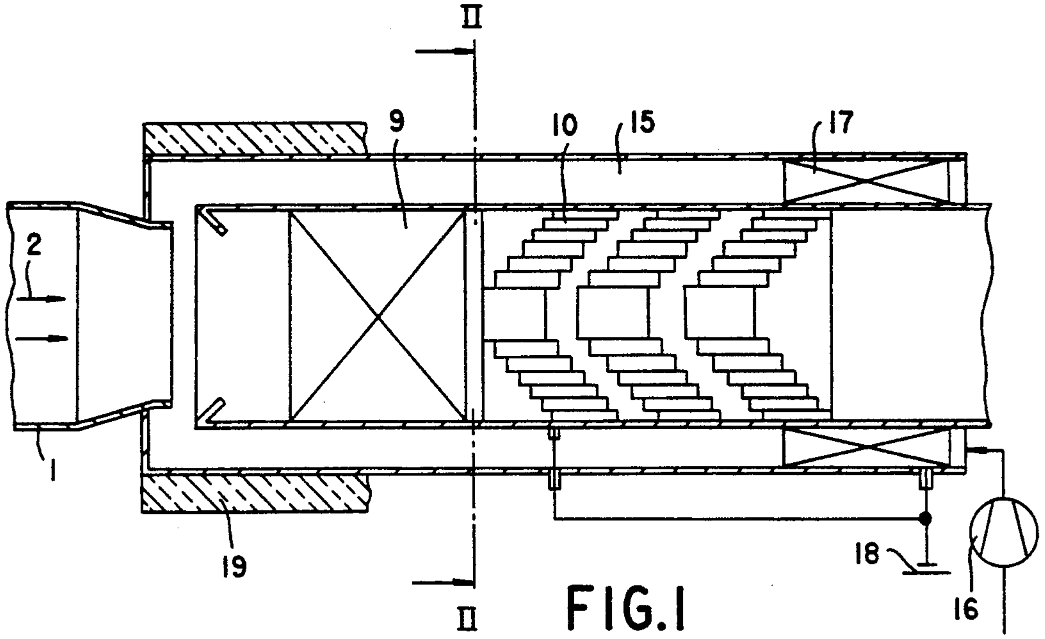
FIG. 1 is a fragmentary, axial longitudinal-sectional view of a catalyst honeycomb body disposed in an exhaust gas channel.

Referring now to the figures of the drawing in detail, it is seen that exhaust gas of a non-illustrated internal combustion engine is removed through a channel or exhaust pipe 1, in which a flow direction of the exhaust gases is indicated by an arrow 2.

Disposed in the exhaust gas flow 2 is a plurality of honeycomb elements. Several elements are shown and referred to as first or upstream honeycomb elements 9 and second or downstream honeycomb elements 10, in this case having a cylindrical shape which is partly constructed as a ring. The honeycomb elements or monoliths 9, 10 may be produced from a ceramic material or from sheet metal. The first honeycomb elements 9 are always provided with a first platinum and/or rhodium-containing coating imparting a catalytic action on the exhaust gas resulting in carbon monoxide contained in it being oxidized to carbon dioxide, while the various oxides of nitrogen are decomposed so that harmless products are eventually given off into the atmosphere. It is known to a person skilled in the art that this catalytic reaction only proceeds in the desired manner if a particular stoichiometric composition of the exhaust gas exists. Non-illustrated devices for controlling the composition of the exhaust gas which are not, however, the subject of the present invention and are assumed to be known, are therefore also necessary in this case.

Figure 2:
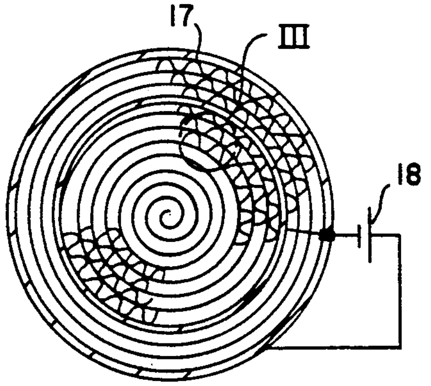
FIG. 2 is a cross-sectional view taken along the line II—II of FIG. 2, in the direction of the arrows.

If additional oxygen is needed in the reactions, for instance to combust carbon dioxide, additional oxygen is fed through air channels 15. These channels can have a self-aspirating action as a result of a suitable construction of their openings extending into the exhaust gas stream 2, so that an adequate air supply is ensured even without the aid of external forces. If the oxygen supply thus provided should not be adequate as a consequence of low exhaust gas velocity (for example, during idling operation of the engine), the air supply can be at least intermittently assisted by a fan 16, as is shown schematically in FIG. 2. Since the air channels 15 are run in countercurrent to the exhaust gas and are in heat exchange with the latter, an adequate preheating of the additional air may be expected during normal operation. Under special conditions, for example at extremely low atmospheric temperatures, it may be advantageous to provide a third honeycomb element 17 in the air channel 15, which is electrically conducting and acts as a radiator as a result of a connection to a power source 18 which is also only shown diagrammatically. In one possible embodiment, the third honeycomb element 17 is built up spirally from alternating smooth and corrugated sheet metal layers 13, 14, like the first and second honeycomb elements 9, 10 that are shown in FIG. 1.

As mentioned, the honeycomb bodies may be produced from ceramic material, as it is well known in the catalytic converter art. Similar to the honeycomb element 17, the other honeycomb bodies 9 and 10 can be connected to the power source 18 and can act as a radiator if the exhaust gas temperature is insufficient. This is possible, despite its increase as a result of the catalytic reaction in the first honeycomb elements 9 and of the action of the second coating on the second honeycomb elements 10. If honeycomb elements 9, 10, 17 produced from ceramic material are used, the catalytic layers themselves expediently serve as thermal conductors since they are formed of metal. In the case of the metallic honeycomb elements acting directly as thermal conductors, it is clear that the individual sheet metal layers 13, 14 are separated from one another by non-illustrated insulating layers as much as is necessary. The second honeycomb elements 10 may have a conical shape as shown in FIG. 1. In the case of the preferably proposed metallic honeycomb elements produced from sheet metal layers 13, 14 that are wound on one another, this shape can be produced without difficulty by pushing the central region of the body axially outwards after winding.

In order to further promote the thermal balance, the catalytic converter assembly may be provided with a thermal insulation 19.

We claim:

1. A catalyst carrier body, comprising a honeycomb element formed of ceramic material having walls defining a multiplicity of channels through which a gas can flow, an electrical auxiliary heater in the form of a catalytically active surface layer disposed on said walls of said honeycomb element, and means connected to said auxiliary heater for electrically heating said catalytically active surface layer.

2. The catalyst carrier body according to claim 1, wherein said catalytically active surface layer is metallic.

3. The catalyst carrier body according to claim 1, wherein said catalytically active surface layer is formed of materials selected from the group consisting of rhodium and platinum.

4. The catalyst carrier body according to claim 1, wherein said electrical heating means include a power source and an electrical connection between said power source and said catalytically active surface layer.

* * * * *